United States Patent [19]

Burghart

[11] 4,405,043

[45] Sep. 20, 1983

[54] DYNAMICALLY BALANCED VIBRATORY SYSTEM

[76] Inventor: George L. Burghart, 2993 Curtiss (Lot 45B), Des Plaines, Ill. 60018

[21] Appl. No.: 272,902

[22] Filed: Jun. 12, 1981

[51] Int. Cl.³ .............................................. B65G 27/24
[52] U.S. Cl. .................................... 198/769; 335/265
[58] Field of Search ............... 198/769, 760, 763, 764, 198/766, 767; 335/265, 277, 269, 248, 257

[56] References Cited

U.S. PATENT DOCUMENTS

| 2,797,796 | 7/1957  | Carrier, Jr. | 198/767 X |
| 3,057,980 | 10/1962 | Ferk et al.  | 335/265 X |
| 3,400,351 | 9/1968  | Flentge      | 335/277 X |
| 4,260,051 | 4/1981  | Burghart     | 198/769 X |

FOREIGN PATENT DOCUMENTS

| 105907  | 1/1899 | Fed. Rep. of Germany | 335/257 |
| 1029288 | 4/1958 | Fed. Rep. of Germany | 198/769 |

Primary Examiner—Andres Kashnikow
Assistant Examiner—Paul A. Sobel
Attorney, Agent, or Firm—Howard H. Darbo

[57] ABSTRACT

A dynamically balanced vibratory feeder system having a material handling component and a counterweighting component, the two components being drivingly interconnected and driven in opposed relative directions in a balanced fashion. The material handling component includes an elongated platform formed to accommodate a material conveying trough. The counterweighting component includes a rigid plate and a balancing counterweight secured to the plate and located between the elongated platform and the plate. The material handling and counterweighting components are periodically driven in opposed relative directions by an electromagnet driver which includes a driving portion and a driven portion. The driving portion is essentially isolated from the reciprocal movement of the material handling and counterweighting components, while the driven portion is connected to drive the material handling and counterweighting components.

18 Claims, 10 Drawing Figures

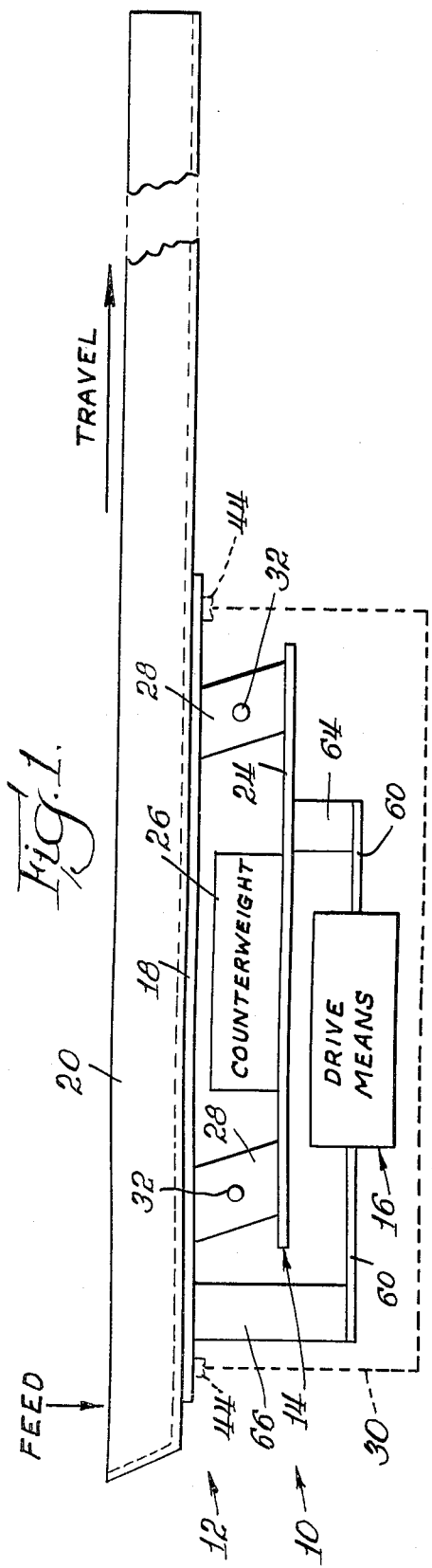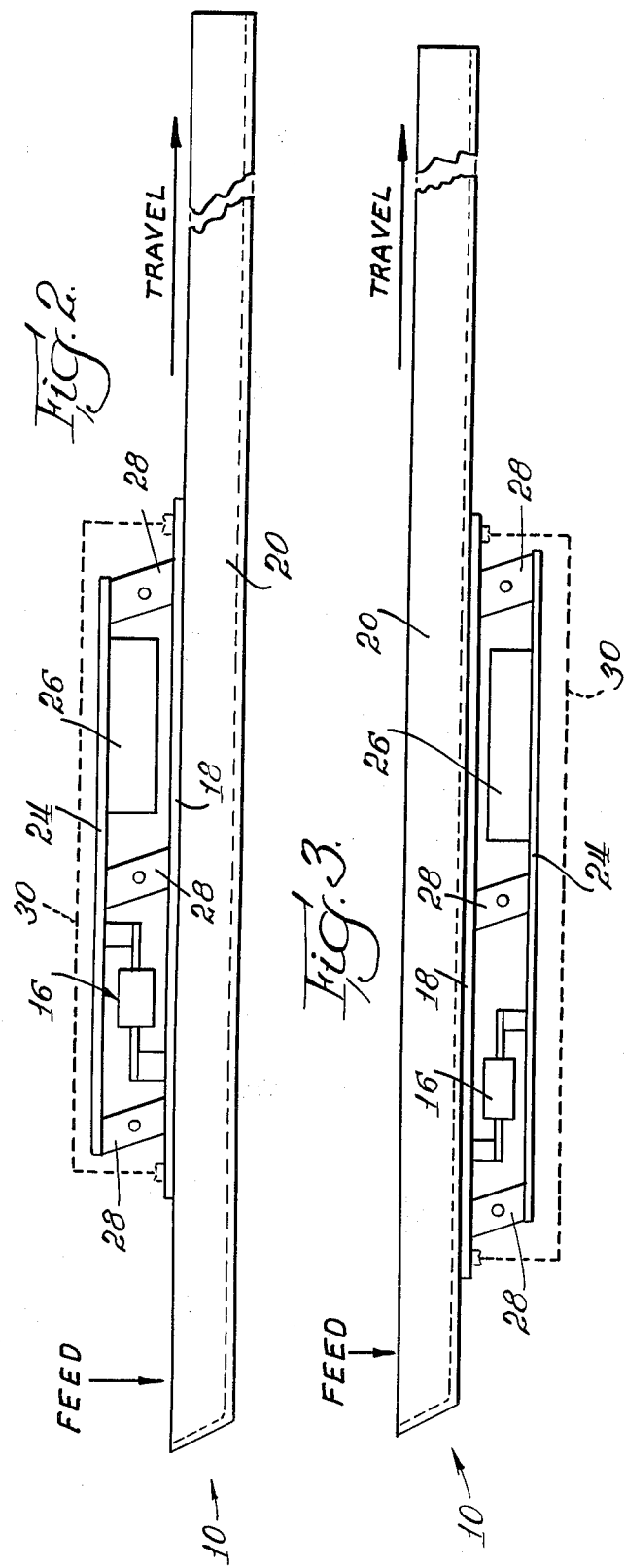

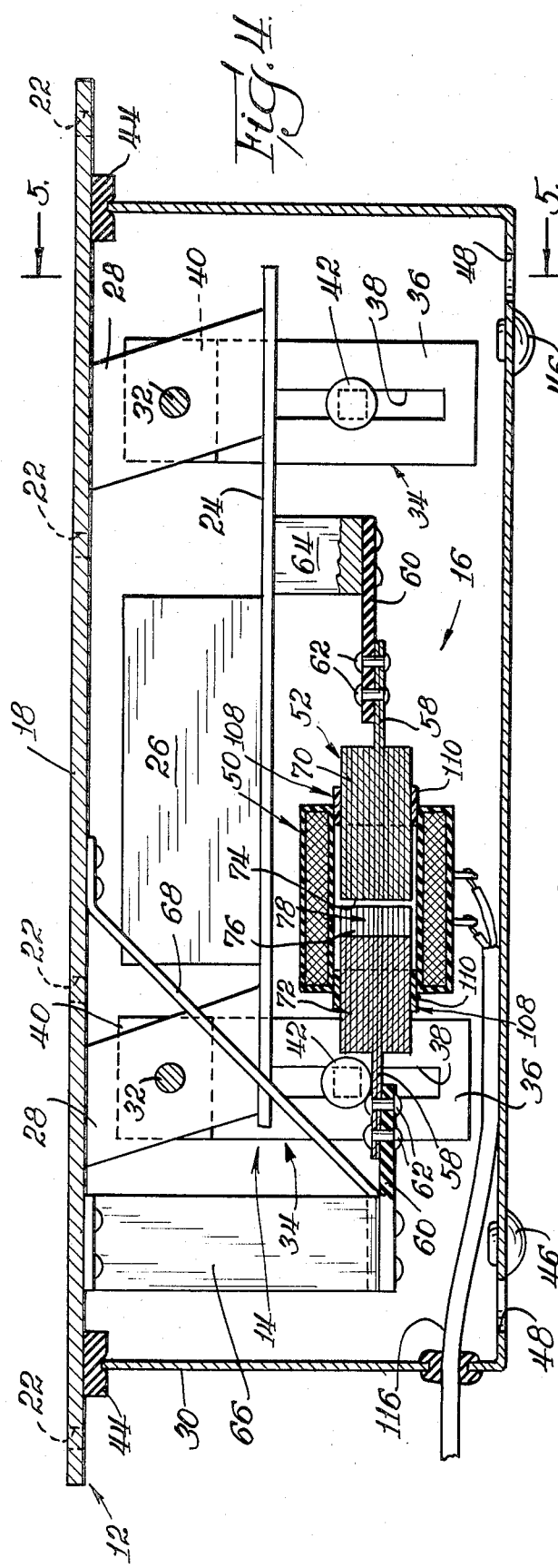
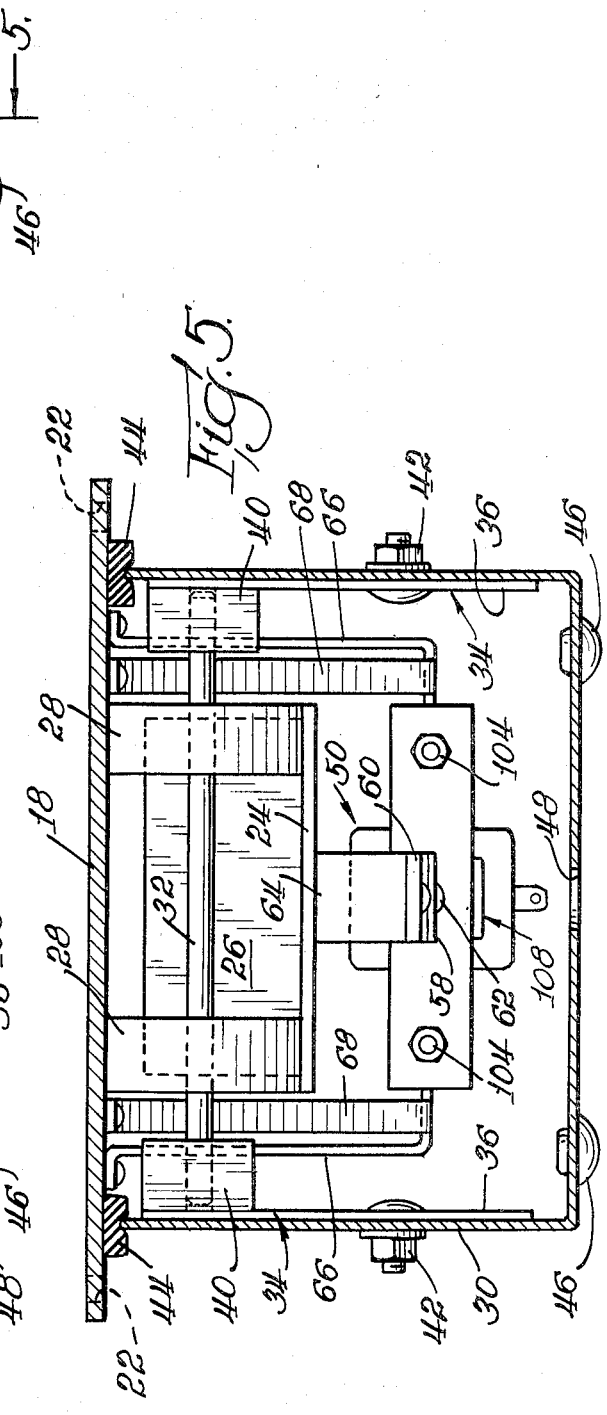

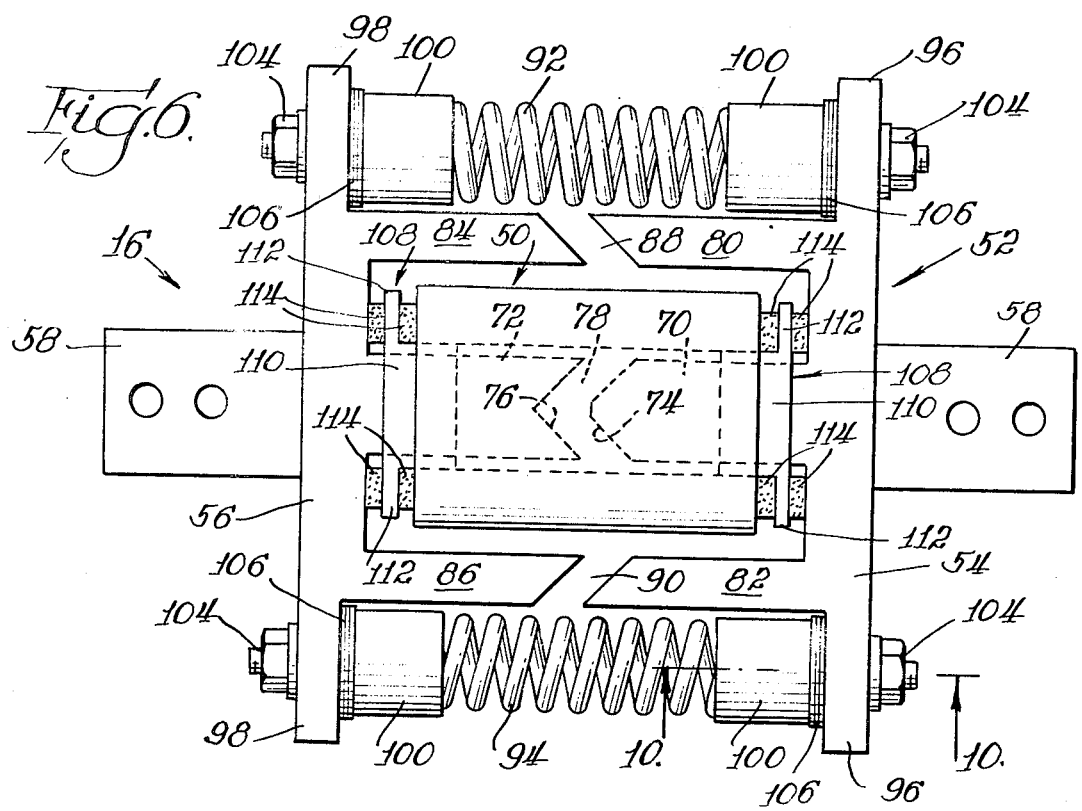
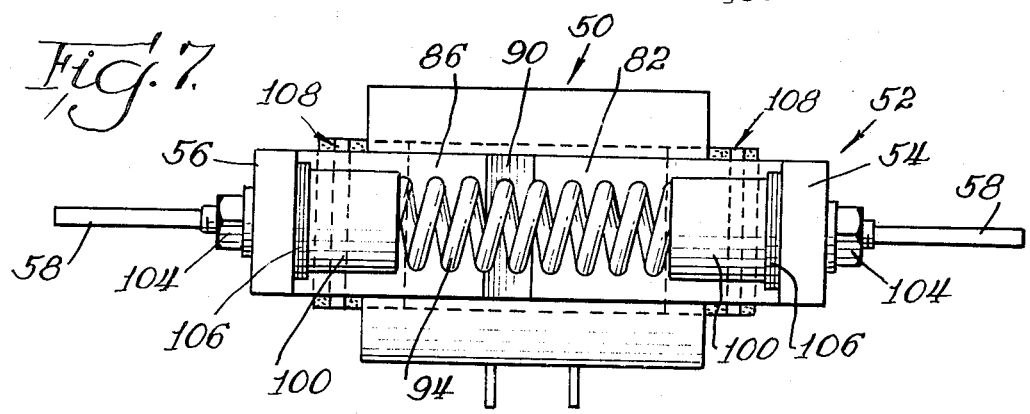
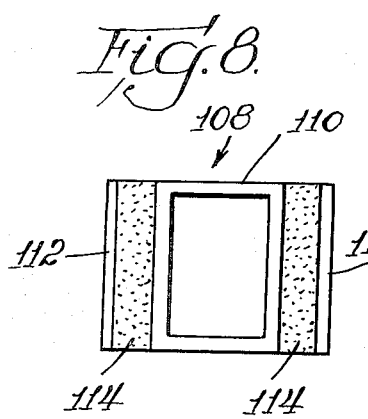
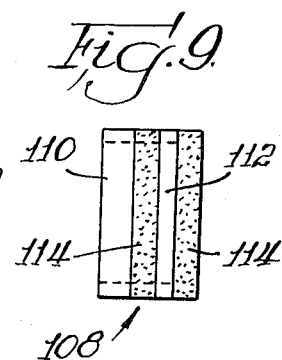
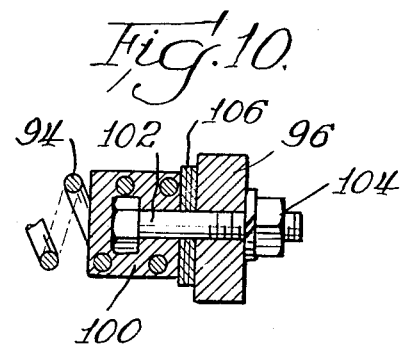

DYNAMICALLY BALANCED VIBRATORY SYSTEM

BACKGROUND OF THE INVENTION

This invention relates to material feeding and conveying systems, and in particular to a vibratory material feeding system which is dynamically balanced and which includes a driver for the system which is isolated from potentially damaging vibration.

As set forth in my prior U.S. Pat. No. 4,260,051, which is incorporated herein by reference, vibratory conveyor systems are used extensively to convey particulate material from one location to another. In my above-referenced u.S. patent, disclosed is a vibratory conveyor system with balanced vibrating and counter vibrating components which is supported at a neutral, non-vibrating position. The conveyor system includes an electromagnet connected between the material conveying and counterweighting components of the system to reciprocally drive the components in opposed relative directions.

I have found that over long periods of time, electromagnet driving means such as that set forth in my U.S. Pat. No. 4,260,051 are susceptible to damage when the electromagnet coil forms a part of the vibrating system. In addition, I found it difficult to adjust the reciprocal stroke of the electromagnet driver in order to lengthen or shorten the strokes or soften the driving action. Finally, I have found it difficult to accommodate the overhang or cantilever type vibratory conveyor because of the need to counteract the off balance extension of the cantilever trough.

SUMMARY OF THE INVENTION

The present invention improves upon my prior U.S. Pat. No. 4,260,051 by providing a dynamically balanced vibratory feeder system with an improved counterweight, a material handling component adaptable to handle both cantilever and non-cantilever material conveying troughs, and an improved driving means having a driving portion and a driven portion, the driving portion being essentially isolated from reciprocal movement of the material handling trough and the counter balancing counterweighting component.

The vibratory feeder system according to the invention comprises a material handling component including an elongated platform oriented substantially horizontally and formed to include a material conveying trough. A counterweighting component having a rigid plate is oriented substantially horizontally and positioned adjacent to the elongated platform, and includes a counterweight secured to the plate, situated between the plate and the platform. A plurality of struts resiliently interconnect the material handling and counterweighting components to allow movement of the two components in opposed relative directions.

Preferably, the material conveying trough is attached to the platform in an appropriate manner, such as with a series of bolts. Alternatively, the platform can comprise a portion of the material conveying trough.

A driving means is connected between the material handling and counterweighting components to reciprocally drive the components in opposite directions, the driving means including a driving portion and a driven portion. The driving portion is essentially isolated from the reciprocal movement of the material handling and counterweighting components, and the driven portion is connected to the material handling and counterweighting components for driving thereof. The entire system is supported upon trunnions extending through the struts at a substantially vibrationally neutral location.

In accordance with the preferred embodiment of the invention, the driving means comprises an electromagnet driver. The driving portion is composed of a periodically actuated electromagnet coil and the driven portion comprises an armature of the electromagnet driver. For balancing of the armature, equal portions of the armature are attached to each of the material handling and the counterweighting components. The electromagnet coil is resiliently mounted upon the armature portions, with the electromagnet coil being essentially isolated from reciprocal movement of the armature portions.

The electromagnet coil has a hollow core and each armature portion includes a leg extending into an opposite end of the hollow core. The legs terminate within the core opposite one another with the opposed terminal ends of the legs forming an air gap between them. The terminal ends are complimentarily shaped at a transverse angle to the direction of movement of the legs within the core in order to permit greater relative movement of the armature portions toward one another than if the terminal ends were flat and oriented perpendicular to the direction of movement.

The armature portions are spaced at a particular separation from one another when the vibratory feeder system is at rest. The system includes return means to restore the particular separation subsequent to relative movement of the armature portions. In the preferred form of the invention, the return means comprises a pair of balanced coil springs attached to opposite sides of the armature. The separation between the armature portions can be changed when at rest by adding shims to the balanced coil springs.

In addition to the leg extending into the hollow core, each armature portion includes a second leg exterior to the core extending transversely to the first leg. For neutral mounting of the electromagnet coil, the mounting for the coil comprises a resilient separator situated adjacent each first leg between the coil and the transversely located second leg. In addition, an elastic sleeve is mounted upon each first leg to space the leg from the coil within the hollow core. The resilient separator may be cemented to the sleeve, or it may be separately mounted upon the first leg.

BRIEF DESCRIPTION OF THE DRAWINGS

The invention is described in greater detail in the following description of the preferred embodiments, taken in conjunction with the drawings, in which:

FIG. 1 is a side elevational view of the vibratory feeder system according to the invention with portions removed for better illustration, FIG. 2 is a side elevational view of an alternative embodiment of the invention, FIG. 3 is a side elevational view of yet another alternative embodiment of the invention, FIG. 4 is an enlarged cross-sectional illustration of the vibratory feeder system according to the invention with the material conveying trough omitted, FIG. 5 is a cross-sectional illustration taken along lines 5—5 of FIG. 4, FIG. 6 is a top plan view of the driving means according to the invention, FIG. 7 is a side elevational illustration of the driving means shown in FIG. 6, FIG. 8 is a front elevational view of one embodiment of the mounting means for the driving portion of the driving means shown in FIG. 6, FIG. 9 is a side elevational view of the mounting means of FIG. 8, and FIG. 10 is a cross-sectional illustration taken along lines 10—10 of FIG. 6.

DESCRIPTION OF EXAMPLES EMBODYING BEST MODE OF THE INVENTION

A first embodiment of the invention is shown diagrammatically in FIG. 1 and in greater detail in FIGS. 4 through 10. The vibratory feeder system is depicted generally at 10 and includes as primary elements a material handling component 12, a counterweighting component 14 and a driving means 16. The driving means 16 is connected between the material handling component 12 and the counterweighting component 14 to reciprocally drive the components 12 and 14 in opposed relative directions, as described in greater detail below.

The material handling component 12 is composed of an elongated platform 18 oriented substantially horizontally. In the embodiment illustrated, a conveying trough 20 is attached to the upper surface of the elongated platform 18. Suitable fasteners (not illustrated) may be employed to effect attachment between the elongated platform 18 and the conveying trough 20, the fasteners passing through holes 22 located in the platform 18. The length and width of the trough 20 are determined by the requirements of the vibratory feeder system, such as the quantity of material to be handled, the type of material to be conveyed and the distance that the material is to be transported.

The counterweighting component 14 is comprised of a flat, rigid plate 24 oriented substantially horizontally and adjacent to the elongated platform 18. The plate 24 may be composed of a series of rigidly interconnected framework elements or, as shown, plate 24 may comprise a singular structure. A counterweight 26 is secured to the plate 24, the location of the weight 26 being between the platform 18 and the plate 24 for balancing and driving reasons described in greater detail below.

The plate 24 and elongated platform 18 are interconnected by plurality of struts 28. As depicted in my U.S. Pat. No. 4,260,051, the struts 28 are composed of parallelogramic blocks of resilient, elastomeric material, such as rubber, with one end being cemented or attached to the elongated platform 18 and the other end being suitably affixed to the plate 24. The struts 28 are disposed at an acute angle to the vertical and comprise the only connecting support link between the platform 18 and the plate 24. Because of the inclination of the struts, as described below and in my U.S. Pat. No. 4,260,051, material in the trough 20 is driven from left to right (FIGS. 1 through 3) as the system 10 is operated.

The material handling component 12 and the counterweighting component 14 are driven simultaneously in reciprocation in opposed directions by the driving means 16, each component 12 and 14 being free to vibrate responsive to periodic impulses imparted to the components by the driving means 16. No attempt is made to restrain the vibration of either component. Furthermore, in order to eliminate transmission of vibration from the vibrating system of the invention to surrounding structures and environment, the material handling component 12 and counterweighting component 14 are suspended in a fixed base 30 at substantially vibrationally neutral positions of the system 10. The vibrating system, comprising the components 12 and 14, is isolated from the base 30, being suspended by a plurality of axles or trunnions 32. As best shown in FIG. 5, each of the trunnions 32 passes through oppositely located struts 28 and is secured within a support 34 attached to the upstanding walls of the base 30. Supports 34 are composed of a vertical plate 36 having a vertical central slot 38 and a protruding block 40, permanently affixed to the plate 36, which accepts and retains an end of a trunnion 32. Blocks 40 are preferably formed of an elastomeric material, such as rubber, to dampen any spurious vibration which may be transmitted through the trunnions 32.

The plates 36 are attached to the side walls of the base 30 by bolts 42 passing through the slot 38 and a corresponding aperture (not illustrated) in the side walls of the base 30. The slots 38 provide for vertical adjustment of the supports 34, thus permitting adjustment of the vertical placement of the vibrating components 12 and 14 within the base 30.

A series of soft pads or a gasket 44 may be employed to cushion any contact between the stationary base 30 and the vibrating plateform 18. The entire weight of the vibrating system comprising the components 12 and 14 is supported upon the trunnions 32 and the gasket 44 serves only as a water barrier for spray cleaning, not as further support.

The base 30 may be affixed to an adjacent environmental structure, or can sit on a flat surface. Rubber feet 46 may be employed if the system 10 is not attached to a surrounding structure, while one or more of holes 48 formed in the base 30 may be used to suitably attach the system 10 to another structure.

The driving means 16 is connected solely between the material handling component 12 and the counterweighting component 14. As best shown in FIGS. 4 through 10, the driving means 16 preferably is an electromagnet driver, and comprises a driving portion 50 (the coil of the electromagnet) and a driven portion 52 (the armature of the electromagnet driver). The driven portion 52 is composed of armature portions 54 and 56. A tongue 58, suitably attached to each of the armature portions 54 and 56 (means not illustrated), serves as the sole attachment and support for the driving means 16 between the material handling component 12 and the counterweighting component 14.

As best shown in FIG. 4, each tongue 58 is attached to a flexible tie bar 60 by a pair of screws 62. One of the tie bars 60 is attached to a downwardly depending bracket 64 affixed to the underside of the rigid plate 24. The other tie bar 60 is attached to a downwardly depending bracket 66 attached to the underside of the elongated platform 18. The brackets 64 and 66 are sufficiently rigid such that vibrations of the driving means 16 are faithfully transmitted to the material handling component 12 and counterweighting component 14. Since the bracket 66 is somewhat long, to add stiffness, and additional angular bracket 68 attached to the elongated platform 18 and the bracket 66, can be employed.

The armature portions 54 and 56 are, as well known, laminated ferrous material so that periodic excitement of the electromagnet coil of the driving portion 50 will drive the armature portions 54 and 56 in opposite directions. The core of the electromagnet coil comprising the driving portion 50 is hollow, and each armature portion 54 and 56 includes a respective leg 70 and 72 extending into an opposite end of the hollow core. As best shown in FIG. 6, the legs 70 and 72 terminate within the core opposite one another with the opposed terminal ends 74 and 76 of the legs 70 and 72 forming an air gap 78 therebetween.

The translational movement of the legs 70 and 72 is longitudinally within the hollow core of the driving portion 50. The terminal ends 74 and 76 are complimentarily shaped at a transverse angle to the direction of movement of the legs 70 and 72 to permit greater movement between the legs than were the terminal ends flat and oriented perpendicular to the direction of movement. Although as illustrated the terminal ends 74 and 76 are "V"-shaped, other shapes can be employed as required. Variation of the angle cut of the terminal ends 74 and 76 serves to dictate the motional characteristics of the armature portions 54 and 56. As the angle of the terminal ends 74 and 76 are increased from "V"-shape toward flat face shape, the strokes of the legs 70 and 72 are shortened and the severity of the impact of the armature portions 54 and 56 transmitted through the tongues 58 is increased.

The armature portion 54 also includes legs 80 and 82 exterior to the driving portion 50. In a complimentary fashion, the armature portion 56 includes legs 84 and 86. The legs 80 and 84 terminate short of one another forming an air gap 88 between their terminal ends. Likewise, the legs 82 and 86 terminate short of one another, also forming an air gap 90 between their terminal ends. The terminal ends of the legs 80 through 86 are formed at an angle and serve the same function as the angled terminal ends 74 and 76 of the interior legs 70 and 72.

As appreciated from the depiction of the armature portions 54 and 56, the two armature portions are symmetrical. Thus, when the driving portion 50 is energized, the armature portions 54 and 56 move only in a translatory fashion toward and away from one another, and all wracking between the armature portions 54 and 56 is avoided.

To maintain a desired air gap separation between the armature portions 54 and 56, coil springs 92 and 94 are situated respectively between flange extensions 96 and 98 of the armature portions 54 and 56. To further aid in motional symmetry of the armature portions 54 and 56, the coil spring 92 may be a left-hand spring, while the coil spring 94 is a right-hand spring, or vice versa.

Each end of each of the springs 92 and 94 is embedded in a retention plug 100. As best shown in FIG. 10, the plugs 100 include an internal bolt 102 passing from the plug 100 through a bore in the flange extension 96. A nut 104 is used to secure the bolt 102, and hence the retention plug 100, to the flange extension 96.

A series of shims 106 are used to precisely dictate the size of the air gaps 78, 88 and 90 when the system 10 is at rest. By increasing or decreasing the number of shims 106, the air gaps can be increased or decreased in size.

The driving portion 50 is maintained in floating isolation from the reciprocal vibrations of the armature portions 54 and 56. To achieve such isolation without attaching the driving portion 50 separately to the base 30, the invention includes a resilient centering mount 108 inserted into either end of the driving portion 50 and situated upon the respective legs 70 and 72. As best shown in FIGS. 8 and 9, each of the mounts 108 includes a spacer 110 comprising an elastic sleeve of a suitable self-lubricating material, such as nylon or teflon. The spacer 110 is shaped to fit about the legs 70 and 72 and substantially fill the gap between the legs 70 and 72 and the internal hollow core of the electromagnet coil comprising the driving portion 50.

To center the driving portion 50 upon the legs 70 and 72, each spacer 110 includes lateral ears 112 to which resilient cushions 114 are affixed. The cushions 114, which may be formed of foam rubber, center the driving portion 50 within the driven portion 52, yet, due to the resilient nature of the cushions 114, permit the driving portion 50 to remain stationary as the armature portions 54 and 56 are driven.

To impart electrical impulses to the electromagnet coil of the driving portion 50, electrical current is supplied via wires 116 from an electrical source (not illustrated) which, as described in my referenced U.S. Pat. No. 4,260,051, may be composed of a half-wave rectifier or other device appropriate to periodically energize the electromagnet coil of the driving portion 50.

When electrical current is applied to the driving portion 50, the armature portions 54 and 56 are drawn together. Referring to FIG. 4, as a result, the material handling handling component 12 is moved from left to right and is raised slightly while the counterweighting component 14 is moved from right to left and lowered slightly. When the driving portion 50 is de-energized, the springs 92 and 94 return the armature portions 54 and 56 to their normal, rest position. As a consequence, the material handling component 12 returns from right to left and is lowered slightly, while the counterweighting component 14 returns fron left to right and is raised slightly. The resulting motion moves material in the conveying trough 20 attached to the platform 18 from left to right. Troughs of various sizes and weights can therefore be employed with the counterweight 26 being selected such that the weight of the material handling component 12 and the counterweighting component 14 are substantially equal.

As best shown in FIG. 1, when the trough 20 is attached to the platform 18 in a cantilever fashion, it is important that the counter balancing nature of the counterweight 26 be properly employed. With the counterweight 26 mounted on top of the rigid plate 24 and therefore located between the plate 24 and the platform 18, as the driving means 16 is actuated, as described above, the trough 20 is conveyed from left to right with the material handling component 12, while the counterweighting component 14 is conveyed from right to left. When the driving means 16 is deactivated and the components 12 and 14 begin to return to their rest positions, the inertia of reversal of direction causes the trough 20 to raise at its left end and drop at its right end, while the same inertia causes the rigid plate 24 to raise at its right end and drop at its left end. Thus, the counter balancing effect precludes rocking of the system 10, and promotes movement of conveyed material from left to right. However, if the weight 26 were mounted beneath the plate 24, when the driving means 16 is de-energized, reversal of direction causes the trough to raise at its left end and drop at its right end, while the same inertia causes the plate 24 to raise at its left end and lower at its right end. As a consequence, the material handling and counterweighting components 12 and 14 rock in unison, essentially halting any translation of material along the trough 20. Therefore, it is important that the counterweight 26 be mounted between the plate 24 and the platform 18.

Alternative arrangements for the components of the invention are depicted in FIGS. 2 and 3. Since only the arrangement of the components is changed, the individual components retain the same reference numeral designations and will not be described again in greater detail. Turning first to FIG. 3, the structure shown is slightly more compact than that illustrated in FIG. 1 because the driving means 16 has been situated between the elongated platform 18 and the plate 24. Thus, the profile of the system 10 as illustrated in FIG. 3 is substantially lower than that of the system 10 illustrated in FIG. 1. Functioning of the feeder system 10 of FIG. 3 is the same as that of FIG. 1.

The embodiment of the feeder system 10 illustrated in FIG. 2 is essentially inverted from that shown in FIG. 3. The driving means 16 is located between the elongated platform 18 and the plate 24, but in this embodiment, the platform 18 is affixed to the top of the trough 20. Thus, the trough 20 is suspended beneath the platform 18. To do so, the base 30 is supported in a suspended fashion, either from above or from its longitudinal sides. The particular means of supporting the base 30 are unimportant and are not illustrated.

ACHIEVEMENTS

Constructing the driving means 16 in a symmetrical fashion and with the driving portion 50 floating upon the driven portion 52, little if any vibration is imparted to the driving portion 50. If the driving portion 50 were part of the vibrating system, there is the possibility that electrical short circuits or open wiring of the electromagnet coil could occur.

With the terminal ends of the legs 70, 72, 80, 82, 84 and 86 of the armature portions 54 and 56 shaped in an angular fashion, the periodic strokes of the armature portions 54 and 56 can be adjusted in cooperation with the stiffness of the coil springs 92 and 94. If the terminal ends are flat faced, the strokes of the armature portions are hard and short. As the terminal angles are increased, the strokes are softened and lengthened. Depending on the stiffness of the coil springs 92 and 94 and the angular formation of the terminal ends of the legs of the armature portions 54 and 56, any number of stroke characteristics can be created.

Cantilever arrangements, such as those shown in FIGS. 1 through 3, are accommodated by the invention due to proper placement of the counterweight 26 between the platform 18 and the plate 24. A massive, rigid base is not required and therefore the structure of the invention can be significantly lighter in weight than corresponding cantilever structures without a counterweighted counter vibration component.

Various changes can be made to the invention without departing from the spirit thereof or scope of the following claims. For example, for large conveyor troughs, one or more of the feeding systems 10 might be employed in unison to drive the trough. Also, the resilient mounts 108 can be replaced by balancing springs. Other changes can be made to the components of the invention and arrangement thereof as will become evident after having reviewed the description above.

I claim:

1. A dynamically balanced vibratory feeder system comprising:
    a. a material handling component including an elongated platform oriented substantially horizontally and formed to support a material conveying trough,
    b. a counterweighting component having a rigid plate oriented substantially horizontally and positioned adjacent to said elongated platform, said counterweighting component including a counterweight secured to said plate and located between said plate and said elongated platform.
    c. a plurality of inclined struts resiliently interconnecting said material handling and counterweighting components,
    d. driving means comprising an electromagnet driver connected between said material handling and counterweighting components to reciprocally drive said components in opposed relative directions, said driving means including a driving portion and a driven portion, said driving portion being essentially isolated from the reciprocal movement of said material handling and counterweighting components and including means resiliently mounting said driving portion on said driven portion, and said driven portion comprising a portion connected to said material handling component and a portion connected to said counterweighting component, and
    e. means supporting said system upon said struts at a substantially vibrationally neutral location.

2. The vibratory feeder system according to claim 1 in which a material conveying trough is attached to said platform.

3. The vibratory feeder system according to claim 1 in which said platform comprises a portion of a material conveying trough.

4. The vibratory feeder system according to claim 1 in which said driving portion comprises a periodically actuated electromagnet coil and said driven portion comprises an armature for the coil.

5. The vibratory feeder system according to claim 4 in which equal portions of said armature are attached to each of said material handling and counterweighting components.

6. The vibratory feeder system according to claim 4 in which said means resiliently mounting comprises means resiliently mounting said electromagnet coil upon said armature, said resilient mounting means maintaining said electromagnet coil essentially isolated from movement of said armature.

7. In a dynamically balanced vibratory feeder system having a material handling component, a counterweighting component composed to oppositely balance vibrational movement of said material handling component, a plurality of struts resiliently interconnecting said material handling and counterweighting components, and driving means connected between said material handling and counterweighting components to reciprocally drive said components in opposed relative directions, the improvement wherein said driving means comprises an electromagent driver having
    a. a periodically actuated electromagnet coil,
    b. a divided armature having equal portions attached to each of said reciprocally driven material handling and counterweighting components for driving said components upon actuation of said coil, and
    c. means mounting said electromagnet coil upon said armature portions and essentially isolating said coil from the reciprocal movement of said armature portions.

8. The vibratory feeder system according to claim 7 in which said electromagnet coil includes a hollow core, and each said armature portion includes a leg extending into an opposite end of said hollow core, said legs terminating within said core opposite one another with the opposed terminal ends of said legs forming an air gap therebetween.

9. The vibratory feeder system according to claim 8 in which said terminal ends are complementarily shaped at a transverse angle to the direction of movement of said legs within said core.

10. The vibratory feeder system according to claim 8 in which said terminal ends are complimentarily "V"-shaped.

11. The vibratory feeder system according to claim 7 in which said armature portions are spaced a particular separation from one another when at rest, and including return means to restore said separation subsequent to relative movement of said armature portions.

12. The vibrating feeder system according to claim 11 in which said return means comprises a pair of balanced coil springs attached to opposite sides of said armature.

13. The vibratory feeder system according to claim 11 including means to change the separation between said armature portion when at rest.

14. The vibratory feeder system according to claim 7 in which said electromagnet coil includes a hollow core, and each said armature portion includes a first leg extending into an opposite end of said hollow core and a second leg exterior to said core extending transversely to said first leg.

15. The vibratory feeder system according to claim 14 in which said mounting means comprises a resilient separator mounted adjacent each said first leg between said coil and said second leg.

16. The vibratory feeder system according to claim 15 in which said mounting means includes means spacing each said first leg from said electromagnet coil.

17. The vibratory feeder system according to claim 16 in which said spacing means comprises an elastic sleeve mounted upon each said first leg.

18. The vibratory feeder system according to claim 17 in which said separator is attached to said sleeve.

* * * * *